Dec. 18, 1962

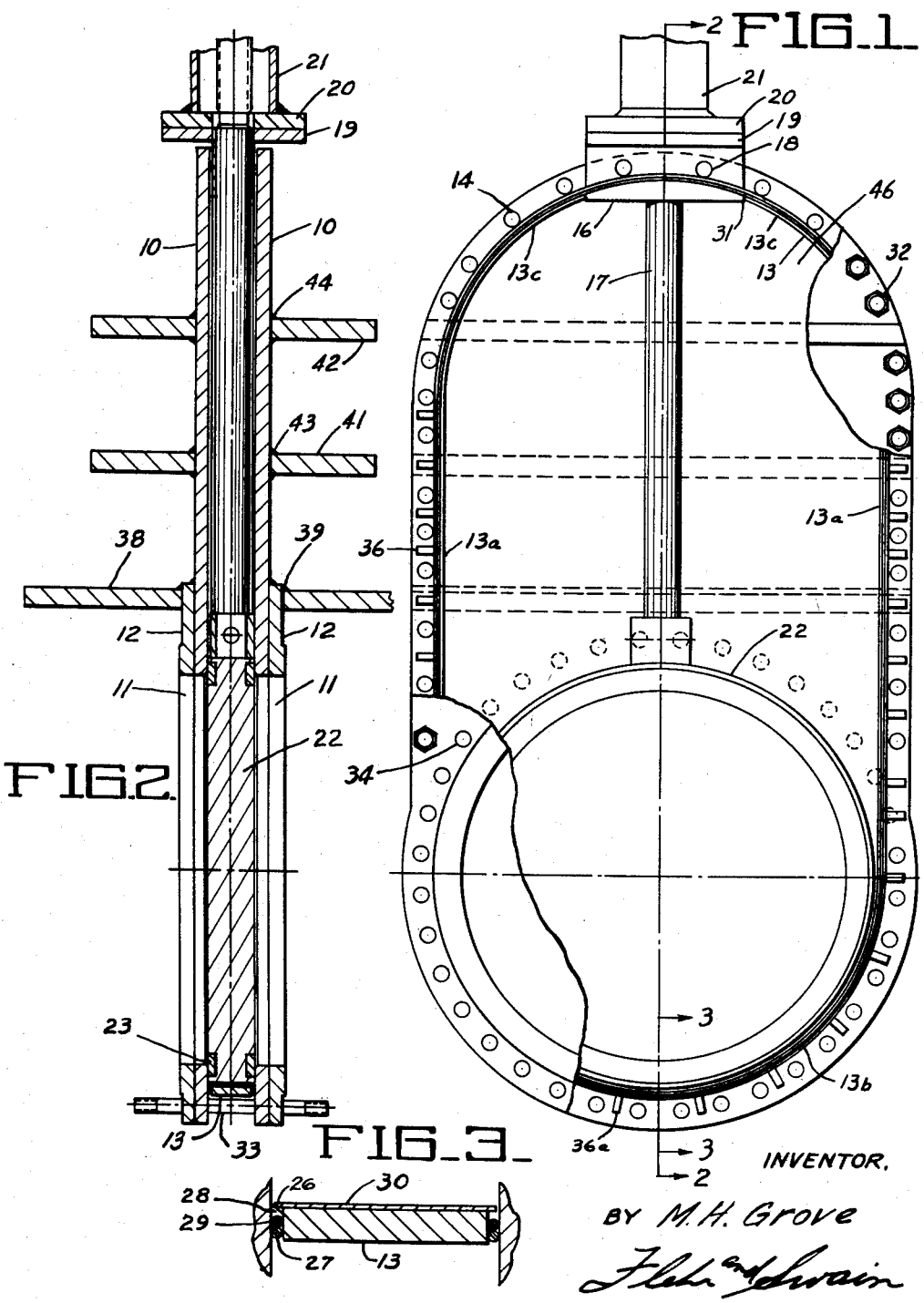

M. H. GROVE 3,069,132

VALVE CONSTRUCTION

Filed Aug. 30, 1962

INVENTOR.
BY M. H. Grove

Dec. 18, 1962 M. H. GROVE 3,069,132
VALVE CONSTRUCTION
Filed Aug. 30, 1962 5 Sheets-Sheet 3
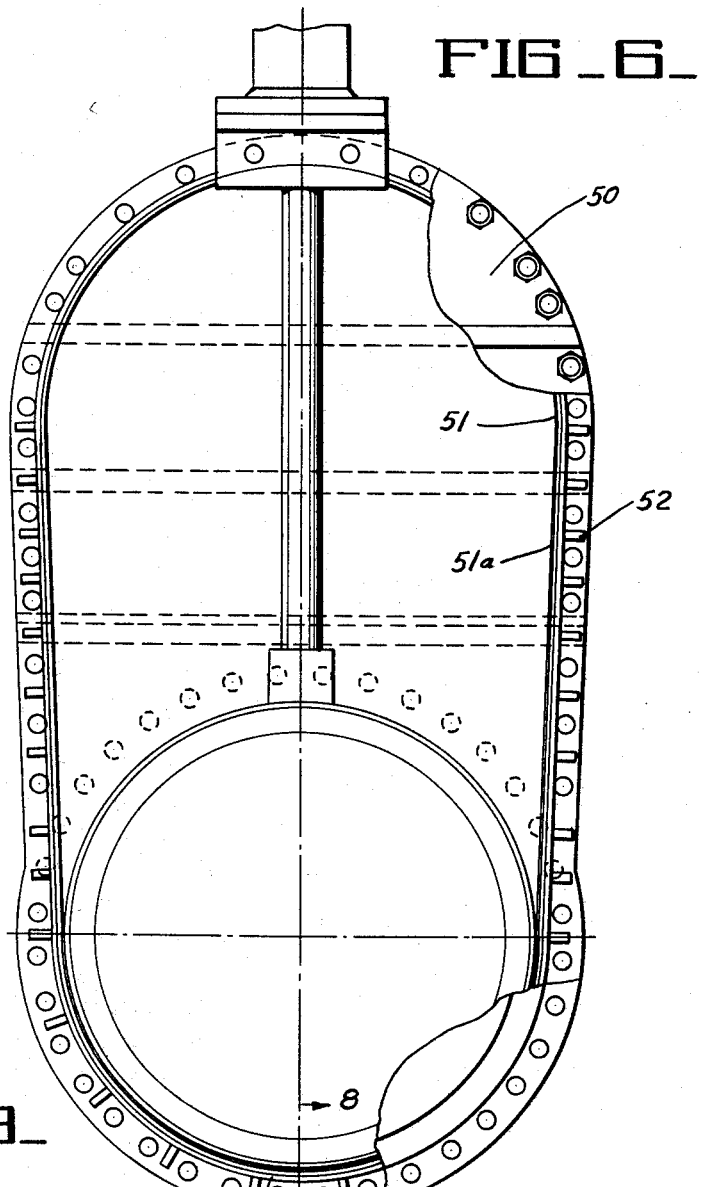
FIG_6_
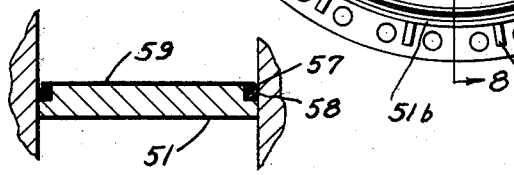
FIG_8_
INVENTOR.
M.H. Grove
BY Dec. 18, 1962 M. H. GROVE 3,069,132
VALVE CONSTRUCTION
Filed Aug. 30, 1962 5 Sheets-Sheet 4
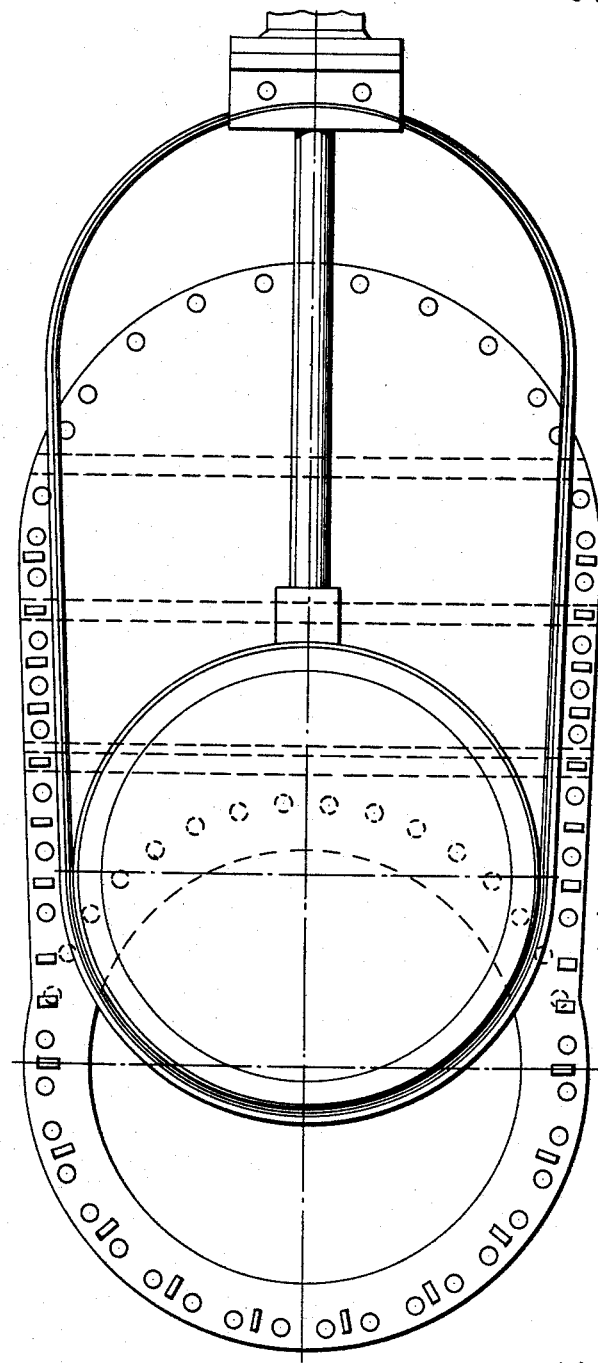
FIG_7
INVENTOR.
BY M. H. Grove.

Dec. 18, 1962
M. H. GROVE
3,069,132
VALVE CONSTRUCTION
Filed Aug. 30, 1962
5 Sheets-Sheet 5
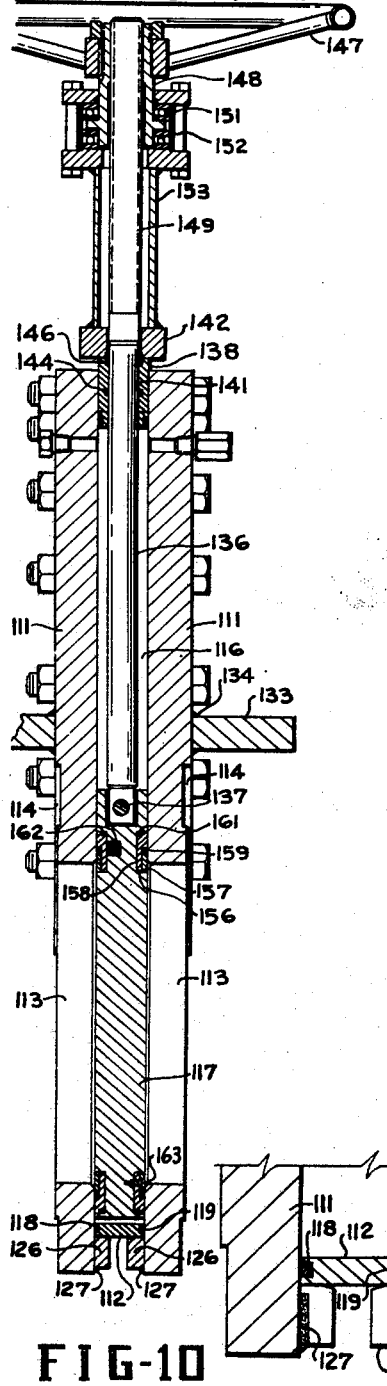
FIG-10
FIG-11
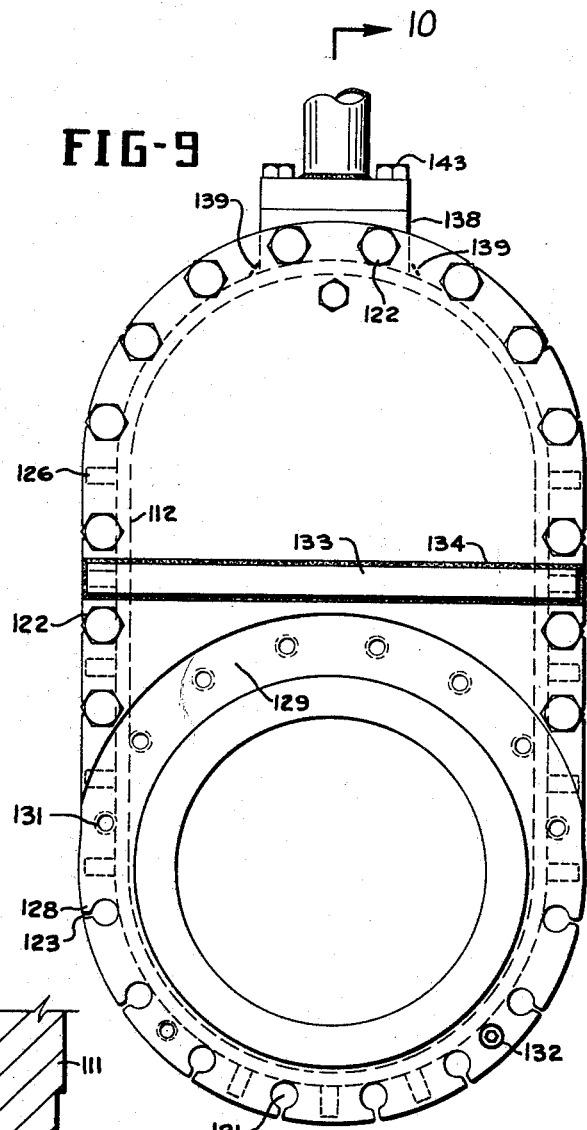
FIG-9
INVENTOR.
M. H. GROVE
BY
ATTORNEY United States Patent Office 3,069,132
Patented Dec. 18, 1962

3,069,132
VALVE CONSTRUCTION
Marvin H. Grove, 340 Hillside Ave., Piedmont, Calif.
Filed Aug. 30, 1962, Ser. No. 220,957
6 Claims. (Cl. 251—329)

This invention relates to a new and improved construction of valves of the gate type. This application is a continuation-in-part of co-pending applications Serial No. 37,319, filed June 20, 1960, and Serial No. 5,430 filed January 29, 1960, which is now abandoned.

This invention relates generally to valves for controlling flow of various fluids, including gases and liquids. More particularly it pertains to valves of the gate type wherein a valve gate is movable between open and closed positions relative to aligned flow passages in the body.

It has been known that the bodies of gate valves can be constructed by applying fabrication techniques, such as by welding or bolting together various structural parts. With prior fabricated constructions of the bolted type, it is necessary to remove the entire valve from the line for making repairs. This is because when the body bolts are removed, no rigid connecting means is provided between the remaining body portions that are attached to the associated piping.

In general, it is an object of the present invention to provide an improved gate valve construction having a fabricated body such that the gate and certain associated parts can be removed for repair or replacement, without removing the valve from the line.

A further problem in connection with valves of the above character has been that the body has not been constructed in such a manner as to permit economical manufacture for a wide variety of sizes and pressure ranges. Assuming that the body consists of plate-like front walls clamped by bolts upon an intermediate body part, the conventional practice is to drill holes through both the margins of the front plates and the intermediate body parts, to receive the clamping bolts. In general this requires the use of an intermediate body part that is dimensioned to resist the internal line pressure and to provide adequate metal for the bolt holes. The relatively large amounts of metal and the number of drilled holes required for this type of construction are substantial factors in overall cost of manufacture.

It is another object of the present invention to provide a new gate valve construction which avoids the use of excessive amounts of metal in the body parts, and which substantially reduces overall weight and cost of manufacture for a valve of a given size and pressure rating.

Another object of the invention is to provide a valve body construction of the above character in which means separate from the clamping means (e.g. bolts) is provided for resisting outward deflection of the intermediate body part.

In the past, gate valves have been made with bodies fabricated from metal side plates bolted together upon an intermediate body part. The manufacture of such valves involves certain problems, including particularly the construction of body parts for economical manufacture and assembly. By way of example, in one known construction the body clamping bolts extend through holes that are machine drilled through the sides and intermediate body parts. This involves a large number of machine drilling operations, and in addition the intermediate body part must be so dimensioned as to provide ample metal for the drilled holes, with the result that the wall thicknesses provided are excessive for the pressure requirements.

In general, it is an object of one form of the present invention to provide a valve construction of the general type described above, but which has body parts so constructed as to facilitate manufacture and assembly.

Another object of the invention is to provide a valve construction of the above character which makes possible substantial economics in the machining operations required.

Additional objects and features of the invention will appear from the following description in which the preferred embodiments have been set forth in detail in conjunction with the accompanying drawing.

Referring to the drawing:

FIG. 1 is a front view of a gate valve incorporating the present invention, with a part of one front wall removed.

FIG. 2 is a cross sectional view taken along the line 2—2 of FIG. 1.

FIG. 3 is a cross sectional detail on an enlarged scale, taken along the line 3—3 of FIG. 1.

FIG. 6 is a view like FIG. 1 but showing another embodiment of the invention.

FIG. 7 is a view like FIG. 6 but showing intermediate body parts being removed together with the gate.

FIG. 8 is a cross sectional detail on an enlarged scale taken along the line 8—8 of FIG. 6.

FIG. 9 is a side elevational view of a modified valve incorporating the present invention.

FIG. 10 is a cross sectional view taken along the line 10—10 of FIG. 9 and showing a hand wheel type of operator.

FIG. 11 is a detail on section showing spacing means which can be employed for one portion of the body.

Figure 5:
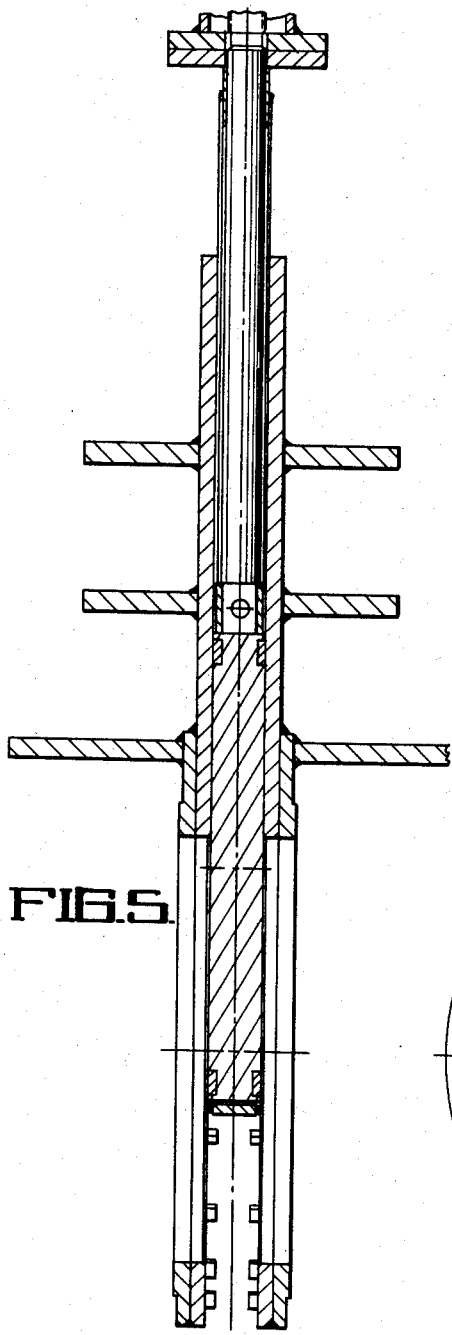
FIG. 5 is a cross sectional view taken along the line 5—5 of FIG. 4.

Referring to FIGS. 1 and 2, the valve consists of a pair of plate-like front walls 10 which have aligned openings 11 for communicating with associated piping. These plates can be formed of standard mill-rolled steel or steel alloy plate of suitable thickness for the required strength. For special services the plates may be formed of stainless steel alloy or nonporous materials like aluminum alloys. The portions of the plates adjacent the openings 11 can be reinforced by welding on the supplemental plates 12. In general the walls 10 are elongated to form an inner space sufficient to accommodate the valve gate. A suitable configuration is shown in FIG. 1, in which it will be seen that the side edges of the walls 10 are substantially straight and parallel, and the end portions substantially circular.

The intermediate body means 13, interposed between the plates 10, is in this instance in the form of a metal strip or band. Here again, various metals and metal alloys can be employed, but in general the material can be the same as used for walls 10. The shaping of this band follows the configuration of the walls 10, with the outer periphery of the band being located immediately within the bolt holes 14. At that end of the body remote from the flow openings 11, the ends of the band 13 are attached to the block 16 as by weld connections. This block has a width corresponding to the width of the band 13, and it is bored to receive the gate operating stem 17. Also it is provided with drilled holes 18 to receive corresponding body bolts. Suitable operating means (not shown) connects with the exterior end of the stem 17 for operating the valve. In FIGS. 1 and 2, an exterior mounting plate 19 is secured to the exterior side of block 16, and serves to mount the bonnet plate 20 which in turn carries the yoke 21. As in conventional gate valve constructions, the bonnet assembly is provided with suitable means (not shown) for preventing leakage of line fluid past the valve stem.

A flat rigid gate 22 is disposed within the body space and is shown provided with suitable means 23 for forming fluid tight seals between the faces of this gate and the adjacent inner surfaces of the body walls 10. The dimensions are such that the gate can be moved from the fully closed position shown in FIGS. 1 and 2, to full open position within the upper end of the body, as the body is illustrated in these figures.

Sealing means is provided to form fluid tight seals between each front wall 10 and the adjacent face of the band 13. Thus as shown in FIG. 3, the end faces 26 of the band 13 are provided with metal wires 27 which extend continuously about the body and across the faces of the block 16. These wires preferably are attached to the band 13 as by spot or continuous welding (not shown). The wires are dimensioned whereby recesses 28 are provided which serve to accommodate the seal rings 29 of the resilient O-ring type. To prevent displacement of the O-rings 28 under certain conditions, a retainer 30 is provided, which can be in the form of a light sheet metal strip which extends between the inner faces of the front walls 10, with its edge margins overlapping and enclosing the recesses 28. The ends of this sheet metal band terminate at the block 16, and are there retained in place by the block corners 31. When the body is assembled the metal wires 27 are clamped between the front walls 10 and the intermediate body band 13, thus serving, in addition to weld connections, to hold such wires in place.

As previously mentioned, the margins of the walls 10 are drilled to provide holes 14 to receive body clamping bolts. The bolts 32 for the upper portions of the body appear in FIG. 1, and are in contact or in close proximity with the outer periphery of the body band 13. For that part of the body surrounding the lower part of the openings 11, stud bolts 33 are shown for this purpose to facilitate attachment of the valve to associated pipe coupling flanges. Threaded holes 34 are shown in portions 12 of the body for receiving pipe coupling studs at locations which are not coincident with centers of body clamping bolts.

Figure 4:
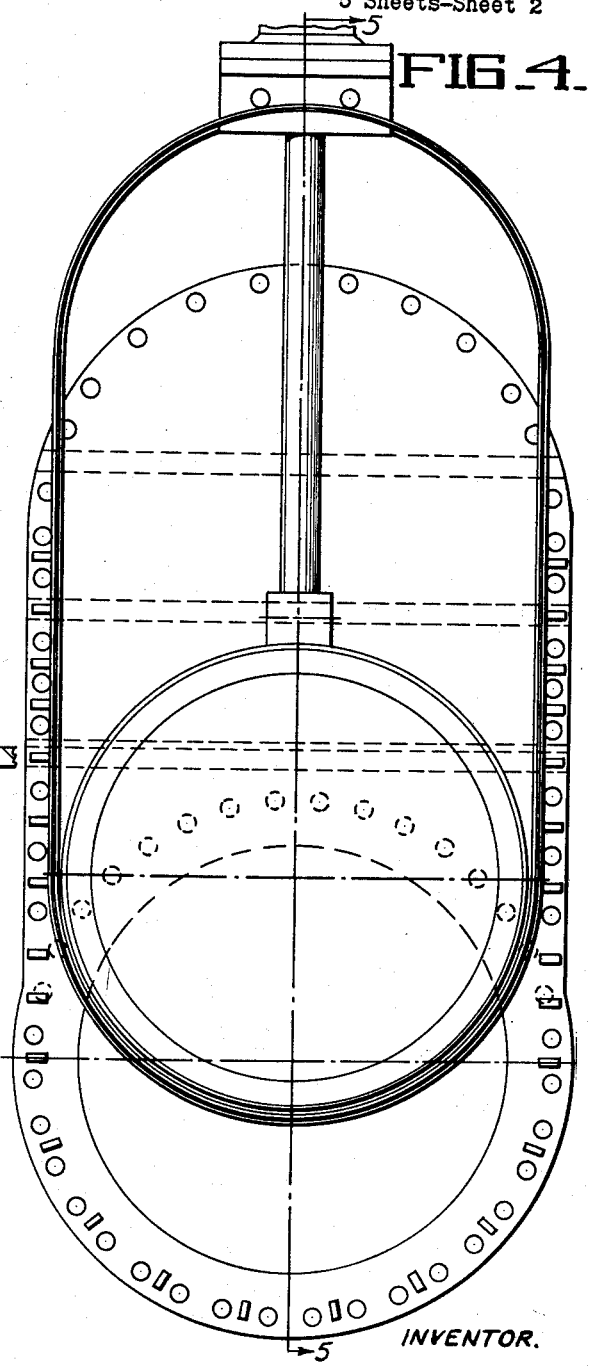
FIG. 4 is a view like FIG. 1, but showing the intermediate body part and the gate being removed through one end of the body.

As shown in FIG. 1, a plurality of lugs 36 are mounted upon the margins of the front walls 10, between the adjacent clamping bolts. These lugs can be proportioned substantially as illustrated in FIGS. 4 and 5, and they are located to abut the adjacent outer peripheral surface of the body band 13. As shown in FIG. 1, these lugs are disposed to engage the outer faces of the side rectilinear portions 13a of the body band. Thus these portions are supported against outer deflection under internal fluid pressure. Some additional lugs 36a of the same kind, are shown located around the bottom of the body for abutment with the corresponding curved end portion 13b of the body band. The other end of the body is not provided with such lugs, and for this part of the body the curved end portions 13c of the body band resist internal pressure by virtue of their inherent strength.

For the higher operating pressures, it is desirable to provide some reinforcement for the front walls 10. Thus reinforcing ribs 38 can be provided in the form of metal plates of suitable size and strength, which may be attached to one edge of the members 12 by weld connections 39. Additional ribs 41 and 42 can be provided and are shown attached to the exterior faces of the front walls 10 by weld connections 43 and 44.

Operation of the valve described above is as follows: Normally the valve is installed in a pipe line, with flanged pipe couplings being bolted against the body portions 12. There is sufficient clearance between the faces of the valve gate 22, and the adjacent inner surfaces of the front walls 10, to permit the gate being moved between open and closed positions in the body space 46. Body bolts normally hold the front walls 10 in tight clamped relationship with the intermediate body band 13, with the resilient O-rings 29 serving to maintain body seals. Outward deflection of the rectilinear side portions 13a of the body band 13 is prevented by the lugs 36, which are carried by the side margins of the walls 10. If one desires to repair the valve without removing it from the line, body bolts 32 at the upper end of the body are removed, and all of the remaining body bolts loosened, thereby relieving clamping forces against the body band 13. The body band 13 together with the gate is now slid lengthwise from the body, as illustrated in FIGS. 4 and 5. Such removal of the body band and the gate is made possible because the body band is not directly attached to the front body walls 10. After the gate and the body band have been removed in this manner, and after the necessary repairs have been made, they can be returned to the body, after which the removed body bolts are applied and all the body bolts tightened to re-establish the desired clamping relationship.

As pointed out above, the lugs 36 in particular reinforce the rectilinear portions 13a of the body band against outward deflection. At the lower end of the body, such lugs need not reinforce the portion 13b of the body band, but they engage the body band to form a limiting stop, thereby properly locating the body band when it is returned after making repairs.

As shown in FIG. 6, the front walls 50 have a modified configuration, in that the side edges are cut to a small taper. The body band 51, corresponding to body band 13 of FIG. 1, has rectilinear portions 51a, but instead of being parallel, these portions are divergent towards the upper end of the body, similar to the taper provided for the side edges of walls 50. The lugs 52, corresponding to the lugs 36 of FIG. 1, are mounted upon the margins of the front walls 50 and are arranged to abut the outer faces of the band portions 51a. Also lugs 53, corresponding to the lugs 36a of FIG. 1, contact and locate the end body band portion 51b. The remaining structural features of the valve can be substantially the same as previously described.

With the construction shown in FIGS. 6 and 7, the valve body as normally assembled provides adequate reinforcement for the rectilinear portions 51a of the body band 51. However, when the body bolts are removed for the upper end of the body, and the remaining body bolts loosened, the body band together with the gate can be readily removed from between the front walls 50, with the lugs 52 offering a minimum amount of resistance because of the divergent or tapered construction previously described.

As shown in FIG. 8, the body band 51 may be milled to form the recesses 57 for the O-ring seals 58. The inner strip 59 retains the O-rings against displacement.

The valve construction illustrated in FIGS. 9 to 11 of the drawing consists of a body formed of rigid side plates 111, which may be duplicates, together with an intermediate rigid body part 112. The side body parts 111 can be formed of flat mill rolled steel or suitable metal or metal alloy, with a substantially oval configuration as shown in FIG. 9. Aligned openings 113 are formed in the side body parts and form fluid passages for making connection with associated piping. The outer faces of the side body parts surrounding the openings 113 are formed in the side body parts and form fluid passages for making connection with associated piping. The outer faces of the side body parts surrounding the openings 113 can be suitably machined as indicated at 114, for cooperating with associated pipe coupling flanges. The inner body space 116 serves to accommodate the valve gate 117. Preferably this gate is formed of flat plate material, and is provided with flat parallel side surfaces.

The intermediate body part 112 preferably is formed as a continuous metal band. A desirable manufacturing procedure is to bend a strip of metal, such as suitable mill rolled steel, into circular form, and to weld the abutting ends together. Thereafter the circular band is machined as by use of a conventional metal cutting lathe, followed by grinding, to finish the end faces and to provide grooves 118 for accommodating the seal rings 119 of the resilient O-ring type. Thereafter the circular ring is placed in a suitable forming die and bent to the desired oval form.

The margins of the side body parts are provided with circumferentially spaced openings 121 for accommodating the clamping bolts 122. Preferably the holes 121 are formed by a torch cutting operation, in conjunction with cutting the side body parts from a larger steel plate. In other words, as a cutting torch moves along a cutting line corresponding to the outer periphery of the side plate, it is repeatedly directed through a slot area 123, and then caused to trace the periphery of a hole 121, after which it returns through the slot area 123 to continue upon the outer peripheral configuration. By this procedure, the majority of the holes required can be formed without conventional machine drilling. Generally the cutting torch operates with sufficient accuracy to avoid any clean up operations. However if desired, the outer peripheral edges of the side body parts can be smoothed as by grinding, and the holes may be smoothed as by reaming.

Means are provided for resisting outwardly deflection or bulging of the intermediate body part, under internal fluid pressure. Thus lugs 126 are mounted upon the margins of the side body parts, as by weld connections 127, and are disposed to engage the outer peripheral surface of the intermediate body part 112. These lugs are disposed between the bolts 122 and are located whereby the lugs, rather than the bolts, engage and serve to resist outward deflection of the intermediate body part. This arrangement is desirable because it permits a substantial amount of looseness between the bolts 122 and the associated torch cut holes 121. Also it avoids placing such stresses upon the portions 128 of the side body parts, which are adjacent to the slots 123.

In FIG. 9 the bolt circle for an associated pipe coupling flange has been indicated at 129. For one-half of this bolt circle threaded openings 131 are shown, which are adapted to receive clamping studs. For the lower half bolts are extended through the openings 121, and are of sufficient length to extend through the pipe coupling flanges. Likewise for this lower portion of the valve body, supplemental clamping screws 132 are provided, to maintain the body parts clamped together irrespective of whether or not the valve is connected in a line.

The side body parts are shown reinforced against outward deflection by the metal ribs 133. These ribs extend across the sides of the body shown in FIG. 9 and may be secured to the side body parts by suitable means such as weld connections 134.

Various types of operating means may be provided for moving the valve gate 117 between open and closed positions. The means illustrated in FIG. 10 is of the hand wheel type. Thus a stem or operating rod 136 has its inner end attached to one edge of the gate 117 by means of pin 137. A block 138 is seated upon the outer peripheral surface of the intermediate body part 112, at the upper or operator end of the valve, and is fixed to the intermediate body part as by weld connections 139. The operating rod 136 extends through a bore 141 formed through the block 138 and the adjacent portion of the intermediate body part. A bonnet plate 142 is mounted upon the outer face of the block 138, as by means of screws 143. Suitable means such as resilient seal rings 144 and 146 of the resilient O-ring type, serve to prevent leakage of line fluid past the operating rod. Block 138 is provided with holes for accommodating two of the body bolts 122 whereby the block is securely anchored to the body.

The operating means illustrated in FIG. 10 includes a hand wheel 147 which is carried by the nut 148. This nut engages the threaded portion 149 formed on the exterior end of the operating rod. Suitable bearing means 151 serves to journal the nut and is carried within a bearing mounting 152 upon the yoke 153. The yoke in turn is mounted upon the bonnet plate 142.

In place of operating means of the hand wheel type it will be evident that other types of operators can be employed, such as pneumatic or hydraulic cylinders, and operators of the electrical motor type.

Suitable means are provided for forming a seal between the gate and the body. In the embodiment illustrated in FIGS. 9–11 sealing means is carried by the gate, and engages the opposed surfaces of the side body parts in regions surrounding the openings 113, on both the upstream and downstream sides. Suitable sealing means is disclosed and claimed in my copending application Serial No. 830,807, filed July 31, 1959. It consists of superposed annular metal members 156 and 157 which are accommodated within the annular recess 158. The two annular members are formed to provide a recess which serves to accommodate the seal ring 159 of the resilient O-ring type. Also the outer periphery of the part 156 is recessed to accommodate the seal ring 161 of the resilient O-ring type. Resilient means, such as plurality of small compression springs 162 serve to urge the assembly just described against the adjacent inner surface of a side body part. Circumferentially spaced screws 163 loosely retain the assemblies upon the gate.

The sealing means described above operates as follows: Normally the springs 162 urge the assemblies outwardly against the adjacent inner surfaces of the side body parts, thereby establishing fluid seals. Assuming that the valve is closed and that a fluid pressure differential is applied to say the left hand passage 113, a fluid pressure area is presented by virtue of the difference in diameters between the seal rings 159 and 161, whereby such upstream fluid pressure tends to urge the assembly formed by annular members 156 and 157, against the upstream side of the valve body. This serves to establish a fluid tight seal upon the upstream side. At the same time the gate is pressed against the downstream side of the valve body, thereby maintaining a fluid pressure seal. It will be understood that although the sealing means just described is desirable and preferable, other types of sealing arrangements can be used.

In general my valve makes use of body parts which are relatively simple and economical to manufacture and which can be readily assembled. As previously mentioned it is relatively simple and economical to torch cut the holes 121. The valve construction is such that such torch cut or "burned" openings, together with the torch cut slots 123, are feasible and practical. This is because the bolts 122 are not called upon to assume any outward thrust applied by the intermediate body part 111. My preferred intermediate body part is relatively simple to manufacture, particularly because it can be machined by ordinary machine turning operations. Also it does not utilize excessive amounts of metal, but only the proper amount of metal for holding the fluid pressures applied to the same. Deflection or bulging of the intermediate body part is prevented by the lugs 126, which transfer forces applied to the same to the side body parts, without such forces being applied to the bolts 122.

With the construction described above it is possible to withdraw the intermediate body part, the gate, and parts associated therewith from the side body parts, without disconnecing the side body parts from associated piping. This can be accomplished by loosening all of the clamping bolts, and removing the bolts at the upper part of the valve body. Thereafter the intermediate body part together with the gate and associated parts can be slid from the valve body. In this connection it will be noted that the lugs 126 are not applied to the upper part of the body and thus do not interfere with removal of the intermediate body part.

What is claimed is:

1. In a valve construction, a valve body comprising two substantially similar plate-like front walls having aligned openings for communicating with associated piping, an intermediate body part interposed between the peripheral margins of said front walls, said intermediate body part comprising integrally connected wall portions extending between the inner opposed faces of the front walls and forming side and end wall portions of the body, said intermediate body part having a configuration such that it forms an enclosed elongated inner body space together with the front walls, a valve gate disposed in said body space and movable therein between open and closed positions relative to said openings, spaced bolts engaging and extending between the margins of the front walls for clamping said front walls upon said intermediate body part, said bolts being located exteriorly of but contiguous to the outer peripheral surface of said sides of said intermediate body part, and a plurality of individual abutments spaced apart from each other along said outer peripheral surfaces of the side wall portions between said bolts for resisting outward deflection of said side wall portions, said abutments being mounted on said margins and extending from the same between said bolts and bearing against spaced regions of said peripheral surfaces to resist outward deflection of said side wall portions when said inner body space is under pressure.

2. A valve construction according to claim 1 in which said intermediate body part together with said gate are retractable through one end of the body upon removal of the clamping bolts from said one end.

3. A valve construction according to claim 2 in which said abutments are disposed to engage both said side wall portions of the intermediate body part and the end wall portion remote from said one end of the body.

4. A valve construction according to claim 1 which further comprises an operating stem attached to said gate, and a rigid block formed integral with one end wall of said intermediate body part, said block having an opening for said operating stem.

5. A valve construction according to claim 4 in which certain of said clamping bolts extend through holes formed in the block.

6. A valve construction according to claim 1 in which said front walls are formed with a plurality of aligned keyhole-shaped slots spaced around the periphery of said front walls, each said slot formed with a narrow straight opening extending substantially perpendicularly inward from the marginal edge of said front wall and widening to a substantially circular hole approximately tangent to the line of contact of the outer peripheral surface of the intermediate body part with the front wall, said opening being substantially perpendicular to adjacent wall portions, said bolts passing through said holes and having a diameter greater than the width of said openings and less than the diameter of said holes.

References Cited in the file of this patent

UNITED STATES PATENTS

| | | |
|---|---|---|
| 1,226,380 | Riley | May 15, 1917 |
| 1,801,237 | Hanson | Apr. 14, 1931 |

FOREIGN PATENTS

| | | |
|---|---|---|
| 1,002,580 | Germany | Feb. 14, 1957 |
| 1,053,141 | France | of 1953 |